United States Patent
Kirby et al.

(10) Patent No.: US 10,693,565 B2
(45) Date of Patent: Jun. 23, 2020

(54) COMPENSATING FOR ENTANGLEMENT LOSS IN COMMUNICATION LINES

(71) Applicant: U.S. Army Combat Capabilities Development Command Army Research Laboratory, Adelphi, MD (US)

(72) Inventors: Brian T. Kirby, Baltimore, MD (US); Daniel E. Jones, Middle River, MD (US); Michael Brodsky, Millburn, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/571,640

(22) Filed: Sep. 16, 2019

(65) Prior Publication Data

US 2020/0145115 A1    May 7, 2020

Related U.S. Application Data

(60) Provisional application No. 62/754,193, filed on Nov. 1, 2018.

(51) Int. Cl.
| | |
|---|---|
| *H04B 10/70* | (2013.01) |
| *B82Y 10/00* | (2011.01) |
| *H04L 5/04* | (2006.01) |
| *G06N 10/00* | (2019.01) |

(52) U.S. Cl.
CPC .............. *H04B 10/70* (2013.01); *B82Y 10/00* (2013.01); *G06N 10/00* (2019.01); *H04L 5/04* (2013.01)

(58) Field of Classification Search
CPC .......... H04B 10/70; H04L 5/04; G06N 10/00; B82Y 10/00
See application file for complete search history.

(56) References Cited

U.S. PATENT DOCUMENTS

| | | |
|---|---|---|
| 6,897,434 B1 | 5/2005 | Kumar et al. |
| 7,006,267 B2 | 2/2006 | Franson et al. |
| 7,248,695 B1 | 7/2007 | Beal et al. |
| 7,317,574 B2 | 1/2008 | Zoller et al. |
| 7,346,246 B2 | 3/2008 | Munro et al. |
| 7,667,995 B1 | 2/2010 | Leuenberger et al. |
| 7,889,992 B1 | 2/2011 | DiVincenzo et al. |
| 8,921,826 B2 | 12/2014 | Hayat et al. |
| 8,983,303 B2 | 3/2015 | Meyers et al. |

(Continued)

OTHER PUBLICATIONS

Verstraete, F., et al., "Local filtering operations on two qubits," Physical Review A, vol. 64, Jun. 5, 2001, pp. 010101-1 through 010101-4.

(Continued)

*Primary Examiner* — Daniel Petkovsek
(74) *Attorney, Agent, or Firm* — Eric B. Compton (57) ABSTRACT

Methods and apparatuses are provided that compensate for the polarization dependent loss (PDL) of fiber-optic quantum channels. Compensation is accomplished by inserting a compensating PDL into another quantum channel carrying entangled photons that are entangled with photons in the first channel having losses that are to be compensated for. By selecting the optimum magnitude and orientation for the compensating PDL, compensation for the PDL in the first channel is maximized.

20 Claims, 7 Drawing Sheets

(56) References Cited

U.S. PATENT DOCUMENTS

| | | | |
|---|---|---|---|
| 9,270,385 B2 | 2/2016 | Meyers et al. | |
| 9,294,191 B2 | 3/2016 | Peters et al. | |
| 9,664,566 B2 | 5/2017 | Hughes et al. | |
| 9,735,890 B2 | 8/2017 | Agarwal et al. | |
| 2004/0264958 A1 | 12/2004 | Zoller et al. | |
| 2005/0131746 A1 | 6/2005 | Beausoleil et al. | |
| 2013/0322873 A1* | 12/2013 | Stevenson | H04B 10/07 398/25 |
| 2016/0164615 A1* | 6/2016 | Dailey | H04B 10/70 398/149 |

OTHER PUBLICATIONS

Verstraete, F., et al., "On Quantum Channels," Cornell University, arXiv.org > quant-ph > arXiv:quant-ph/0202124, Feb. 21, 2002, pp. 1-14.

Kwiat, P., et al., Experimental entanglement distillation and 'hidden' non-locality, Nature, vol. 409, Feb. 22, 2001, pp. 1014-1017.

Thew, R., et al., "Mixed state entanglement: Manipulating polarization-entangled photons," Physical Review A, vol. 64, Jul. 18, 2001, pp. 022320-1 through 022320-11.

Brian Kirby, Daniel Jones, and Michael Brodsky, "Local filtering operations on a pair of entangled qubits implemented by a fiber polarization dependent loss emulator," American Physical Society March Meeting: Los Angeles, CA. Mar. 5-9, 2018 (Presented at session on Friday, Mar. 9, 2018).

D. E. Jones, B.T. Kirby, M. Brodsky, "Entanglement loss and recovery due to arbitrarily oriented polarization dependent loss for telecom band photon pairs," 2018 Conference on Lasers and Electro-Optics (CLEO 2018), San Jose, CA. May 13-18, 2018.

D. E. Jones, B.T. Kirby, M. Brodsky, "Polarization dependent loss in optical fibers—does it help or ruin photon entanglement distribution?" Optical Fiber Communication Conference 2018, San Diego, CA. Mar. 11-15, 2018.

M. Brodsky, B.T. Kirby, D. E. Jones, "Entanglement recovery by manipulating photonic quantum states in optical fibers." IEEE Summer Topicals, Waikoloa, HI. Jul. 9-11, 2018 (Abstract).

D. E. Jones, B.T. Kirby, M. Brodsky, "PDL-induced entanglement degradation in fibers with PMD," 2018 IEEE Photonics Conference (IPC 2018), Reston, VA. Sep. 30-Oct. 4, 2018.

B.T. Kirby, D. E. Jones, M. Brodsky, "Local filtering of polarization entangled photon pairs by the components of a telecom network," Frontiers in Optics 2018, Washington, DC. Sep. 16-20, 2018.

Daniel E. Jones, Brian T. Kirby and Michael Brodsky, "Tuning quantum channels to maximize polarization entanglement for telecom photon pairs." Nature Partner Journals (Published online Nov. 6, 2018).

Brian T. Kirby, Daniel E. Jones, and Michael Brodsky, "Effect of polarization dependent loss on the quality of transmitted polarization entanglement." Journal of Lightwave Technology, vol. 37, No. 1, Jan. 1, 2019 (Date of publication Nov. 14, 2018).

* cited by examiner

COMPENSATING FOR ENTANGLEMENT LOSS IN COMMUNICATION LINES

CROSS REFERENCE TO RELATED APPLICATIONS

This application claims the benefit of U.S. Provisional Patent Application No. 62/754,193 filed on Nov. 1, 2018, which is incorporated herein by reference in its entirety.

GOVERNMENT INTEREST

The embodiments herein may be manufactured, used, and/or licensed by or for the United States Government without the payment of royalties thereon.

BACKGROUND

Technical Field

The embodiments herein generally relate to a method and apparatus for compensating for entanglement loss in communication lines. Some embodiments herein are particularly suited for compensating for entanglement loss in telecommunication networks.

Description of the Related Art

The application of the phenomenon of quantum entanglement to optical telecommunications has been the subject of research and development in recent years. The use of quantum entanglement in telecommunications holds the promise of fast and secure communications. Quantum entanglement refers to a phenomenon predicted by quantum physics, and experimentally proven, where two "entangled particles" will exhibit properties that correlate with one another such that a change in a property of one entangled particle will result in a corresponding or resulting change occurring in the same property of the other entangled particle regardless of the distance that separates them. By creating a pair of entangled particles and transmitting each to a respective node at a corresponding end of a telecommunication line or channel, measurements made on these entangled particles can exhibit correlations stronger than what is possible classically.

Different quantum states of the property in question are chosen to code for a logical one or a logical zero. Each quantum state coding for a one or zero in a sequence of such quantum states is referred to as a qubit, which is a contraction of quantum bit, and is the quantum analog of the classical bit of classical digital systems. Currently proposed quantum telecommunication systems use pairs of entangled photons as the entangled particles and the particle property used for signal or data transmission is the polarization of the photons. The choice of photons as the entangled particles advantageously allows the use of much of the existing fiber-optic telecommunications infrastructure.

The extent of the preservation of the entanglement between the photons during transmission of the photons through fiber-optic cables is one of the key factors in providing an effective quantum communications network or system. Photons transmitted through fiber-optic channel are subjected to inherent losses that may lead to photon disentanglement or channel decoherence. Accordingly, there is a need for effective and efficient ways to compensate for losses in fiber-optic channels in order to preserve photon pair entanglement, which is essential for making quantum communication networks possible, particularly over long distances.

SUMMARY

The embodiments disclosed herein are methods and apparatuses for the recovery of diminished quantum entanglement of polarization degrees of freedom of photon pairs in quantum networks. Considering entanglement degradation due to polarization dependent loss (PDL), the methods herein prescribe how a specific compensating PDL element inserted into one of the communication channels could recover the entanglement lost due to the detrimental effects of PDL in either or both channels. Notably, this compensation can be performed non-locally in the sense that the innate PDL of the system and the additional compensating PDL do not need to be applied to the same qubit of the entangled pair.

A basic feature of the embodiments herein is that a single PDL element can be inserted into a certain channel of the network in order to compensate for the effects of PDL inherent to several channels of the transport layer of the network. The embodiments herein rely on a novel model which allows an actual PDL element acting on one qubit of an entangled state to also be considered as a virtual element acting on the other qubit of the pair.

The methods herein allow for control of a global characteristic of a quantum network, the entanglement between two qubits, by only acting on a single local system. That is the method compensates for the aggregate PDL of the entire system with only a single local operation on one of the qubits. Furthermore, the methods herein allow for compensation to occur in either channel and is therefore significantly more convenient since all compensation can occur at a single location. The embodiments herein rely on a model developed by the inventors and verified in their laboratory.

In view of the foregoing, one of the embodiments disclosed herein is directed to a communication system comprising at least one entangled photon source; at least a first transmission channel and a second transmission channel, the first transmission channel exhibiting an entanglement loss; and a compensating loss element provided in the second transmission channel. The entanglement loss in the first transmission channel in referred to herein as the first entanglement loss for convenience. The compensating loss element is capable of providing at least a compensating polarization dependent loss ($PDL_{comp}$). The $PDL_{comp}$ is selected such that the $PDL_{comp}$ compensates for at least a portion of the first entanglement loss, and the compensating loss element is configured to provide the $PDL_{comp}$.

Another one of the embodiments disclosed herein is directed to a method comprising providing a compensating loss element in the second transmission channel; and selecting a $PDL_{comp}$, which is a compensating loss. The $PDL_{comp}$ is selected such that the $PDL_{comp}$ compensates for at least a portion of the first entanglement loss. The compensating loss element is configured to provide the $PDL_{comp}$.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The following abbreviations are used herein and in the drawings:

EPS—entangled photon source
DSF—dispersion-shifted fiber
PDL—polarization dependent loss
PMD—polarization mode dispersion
PA—polarization analyzer
SPD—single photon detector
CC—coincidence electronics Quantum networks that exploit quantum entanglement are believed to offer solutions for applications including secure communication, network detectability, stealth reconnaissance, sensing, detection free communication in networks with limited trust, and the identification of potentially compromised network nodes. All of these potential applications depend on the ability of a network to entangle remote nodes by the transmission of entangled photons via an entanglement distribution system. The embodiments herein provide a tool for the improvement of entanglement quality in a network setting.

The embodiments herein provide methods for compensating for the deleterious effects of modal loss on quantum state distribution in quantum networks. The advantage of some of the embodiments herein is that all of the PDL degrading the transmission of a two-qubit pair through a quantum network can be compensated for with a single element that does not need to be in the same channel as the PDL inherent to the network. Some embodiments herein employ methods for mapping actual PDL elements from one channel into virtual elements in another.

The embodiments herein are provided to solve the problem of compensating for inherent PDL in transmission channels and optical components which degrade the overall entanglement of states transmitted though quantum networks. Some embodiments herein can be used to improve the entanglement quality of a two qubit state being transmitted through a quantum network which is undergoing PDL due to the inherent properties of the transmission channels or optical components constituting the network.

The embodiments herein include methods that allow an actual PDL element in one channel of a quantum network to be transformed into an equivalent but virtual PDL element in another channel. Some embodiments herein can be used to combine all PDL in a quantum network into a single virtual element which can then be compensated with the addition of a single actual PDL element that provides an orthogonal compensating PDL of equivalent magnitude. Previous techniques required the PDL in each channel to be compensated for individually with additional elements in that same channel.

The ability to distribute entanglement to remote locations is an essential feature of future quantum networks. The quality of entanglement could suffer during transmission due to interactions with the transmitting channels. One of the impairments inherent specifically to optical fiber routes is PDL. By utilizing the rotational form of the PDL operator the inventors have been able to obtain analytical expressions for the entanglement metrics of a pair of polarization-entangled qubits traversing channels with PDL of arbitrary magnitude and orientation. The conditions for which PDL in one channel can compensate for the effect of the other channel are provided in accordance with the embodiments herein. The method can be generalized such that a single PDL element can compensate for all PDL in either channel of a Bell state. Furthermore, a quantum networking fiber-optic telecom testbed is used to verify the embodiments herein experimentally. The entanglement is degraded by introducing a controlled PDL in one channel and to compensate for its effect by a properly matched PDL in the other channel.

Referring to FIGS. 1 through 3B, a communication system 100 in accordance with the embodiments herein is provided. The communication system 100 comprises at least one entangled photon source 102; at least a first transmission channel 104 and a second transmission channel 106, the first transmission channel 104 exhibiting a first entanglement loss 103; and a compensating loss element 108 provided in the second transmission channel 106. The compensating loss element 108 is configured to selectively provide a $PDL_{comp}$, and the $PDL_{comp}$ is selected such that the $PDL_{comp}$ compensates for at least a portion of the first entanglement loss.

Figure 1:
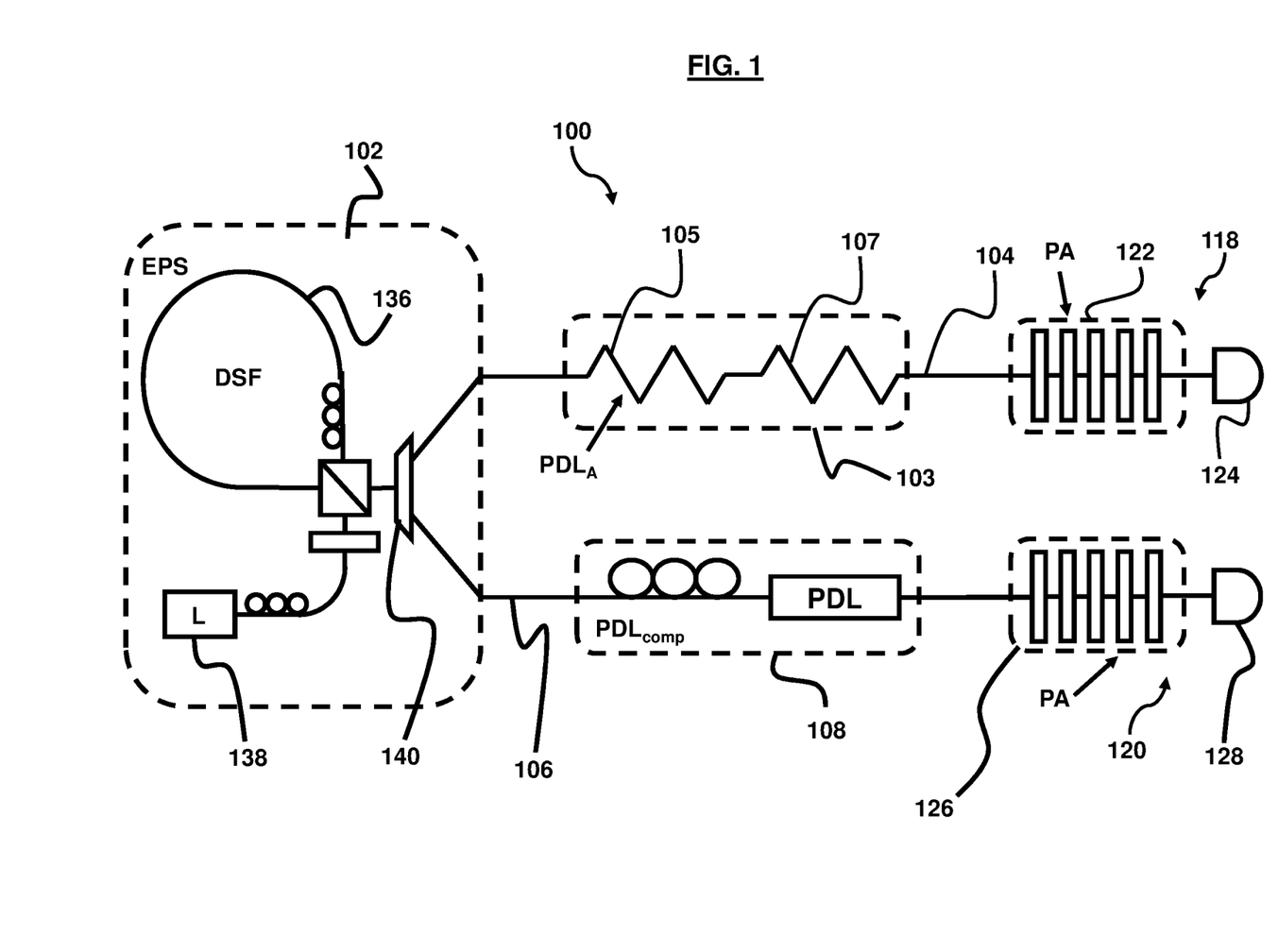
FIG. 1 is a schematic diagram illustrating an embodiment of the communication system according to an embodiment herein.

The entangled photon source 102 outputs photons in the form of pairs of entangled photons. The first transmission channel 104 has an input and an output, and the second transmission channel 106 has an input and an output. At least some photons from the entangled photon source 102 are directed to the input of the first transmission channel 104 for transmission via the first transmission channel 104. At least some other of the photons from the entangled photon source 102 are directed into the input of the second transmission channel 106 for transmission via the second transmission channel 106.

The photons directed to the input of the first transmission channel 104 or transmitted through the first transmission channel 104 are referred to as first channel photons. The photons directed to the input of the second transmission channel 106 or transmitted through the second transmission channel 106 are referred to as second channel photons. At least some of the first channel photons are entangled photons. At least some of the second channel photons are entangled photons that are entangled with a number of the entangled photons in the first transmission channel 104 in accordance with a level of entanglement. The level of entanglement between the entangled photons in each channel at the output of each channel is restored essentially to the level of entanglement between the entangled photons in each channel at the input of each channel as a result of the action of the compensating loss element 108.

The expressions "essentially complete," "essentially the same," and "essentially equal" as used herein mean that the items being considered may be complete, the same, or equal, as the case may be, but if there are any deviations from the corresponding reference conditions or values, then such deviations are negligible from the point of view of the practical operation of the communication system. The expressions "essentially complete," "essentially the same," and "essentially equal" can be understood to exclude deviations that exceed 5 percent of the corresponding reference value.

The level of entanglement is measured by a concurrence value. Concurrence is one of many possible ways to quantify the entanglement of a quantum state; others include entanglement of formation or distillable entanglement. Our choice to use concurrence is arbitrary and any other entanglement metric would also be suitable. A concurrence of 0 corresponds to no entanglement, and a concurrence of 1 corresponds to maximum entanglement. The calculation of concurrence is a standard technique employed in the field of quantum communications. The concurrence value between the entangled photons in each channel at the output of each channel is at least partially restored so as to be closer to the concurrence value between the entangled photons in each channel at the input of each channel as a result of the action of the compensating loss element 108, and in some embodiments the concurrence value between the entangled photons in each channel at the output of each channel is restored essentially to the same concurrence value between the entangled photons in each channel at the input of each channel as a result of the action of the compensating loss element 108.

In order to determine the concurrence, a measurement process known as quantum tomography is performed. This involves measuring both individual and joint measurement rates of the single photon detector 124 in the first channel and the single photon detector 128 in the second channel for 36 different polarization settings of the polarization analyzers 122, 126 in each channel. These measurements are then combined using a maximum-likelihood algorithm that chooses what quantum state of two-qubits is most likely to result in the detector outputs that were measured. The quantum state is given in the form of a density matrix, a 4×4 complex matrix that fully describes the quantum state. Given the density matrix for a two-qubit state, the concurrence is then calculated using a precisely defined set of mathematical steps.

Figure 2:
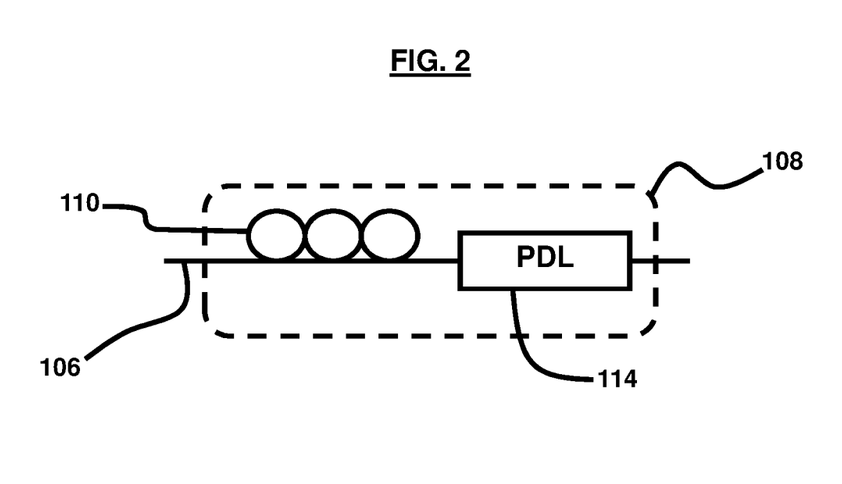
FIG. 2 is a schematic diagram illustrating an embodiment of the compensating loss element for use with a communication system according to an embodiment herein.

In this embodiment, the compensating loss element 108 is a tunable compensating loss element, and the $PDL_{comp}$; i.e., the compensating loss, is selected by tuning the compensating loss element 108 to maximize compensation for the first entanglement loss. The compensating loss element 108 comprises at least one polarization controller 110 and at least one variable PDL emulator 114.

The communication system 100 may further comprise a first detector station 118 and a second detector station 120. The first detector station 118 is provided at the output of the first transmission channel 104. The first detector station 118 may comprise at least one polarization analyzer 122 for the first transmission channel 104 and a single photon detector 124 for the first transmission channel 104. The second detector station 120 is provided at the output of the second transmission channel 106. The second detector station 120 may comprise at least one polarization analyzer 126 for the second transmission channel 106 and a single photon detector 128 for the second transmission channel 106. The polarization analyzers 122, 126 each include several waveplates and a polarization beam splitter. All waveplates are electronically controlled through computer software that controls the entangled photon source, analyzers, and detectors in order to perform quantum state tomography and calculate the concurrence.

The first transmission channel 104 and the second transmission channel 106 may be quantum communication channels. In some examples, the first transmission channel 104 may be a fiber-optic quantum channel. In some examples, the second transmission channel 106 may be a fiber-optic quantum channel or any other quantum channel including, without limitation, vacuum or air.

Some embodiments herein include a method for compensating for entanglement loss in communication channels in a communication system comprising at least one entangled photon source 102 and at least a first transmission channel 104 and a second transmission channel 106. The first transmission channel 104 will usually exhibit an inherent loss referred to herein as a first entanglement loss. Such losses may be due to PDL. Another contributor to the disentanglement of photons may be PMD.

Figure 3A:
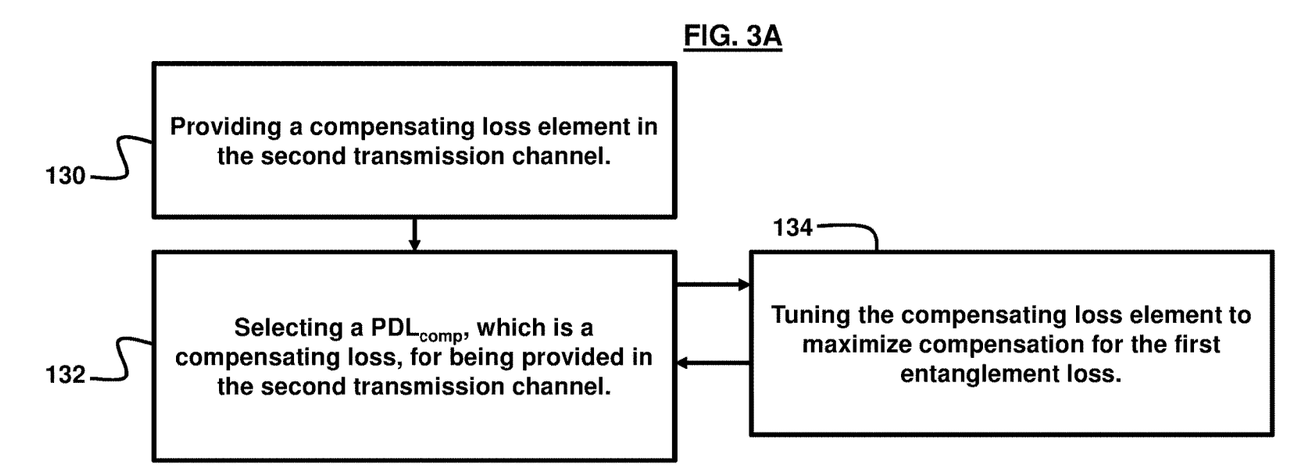
FIGS. 3A and 3B are flow diagrams of methods according to some of the embodiments herein.
Figure 3B:
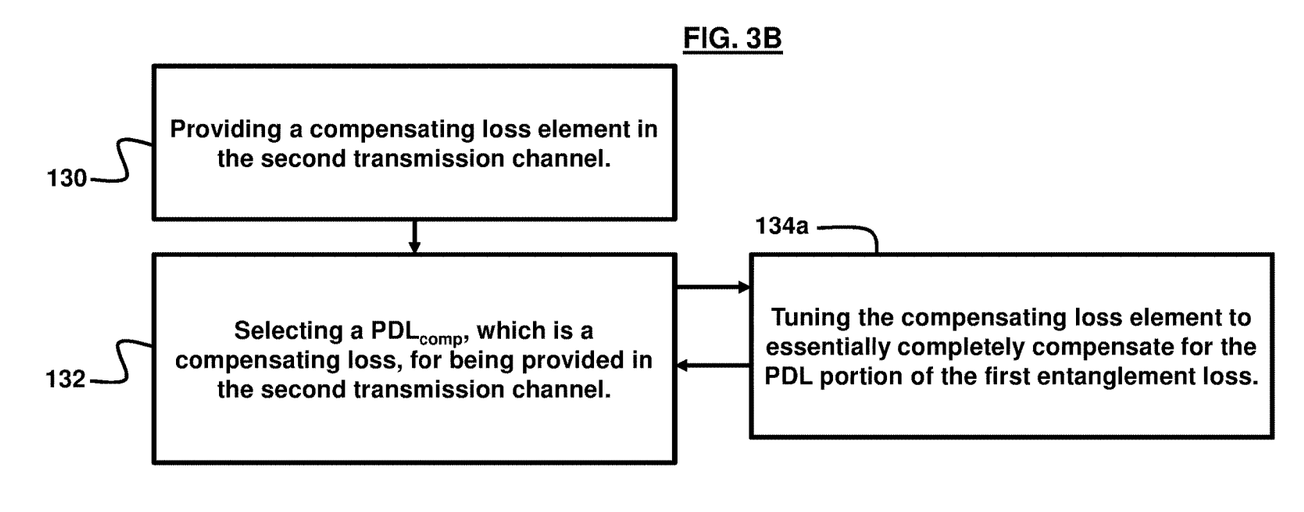

In one embodiment, the method comprises providing (130) a compensating loss element 108 in the second transmission channel 106; and selecting (132) a $PDL_{comp}$, which is a compensating loss, for being provided in the second transmission channel. The $PDL_{comp}$ is selected such that the $PDL_{comp}$ compensates for at least a portion of the first entanglement loss. The first entanglement loss 103 may comprise a PDL portion 105 and a PMD portion 107. The compensating loss element 108 provides the $PDL_{comp}$. The compensating loss element 108 may be configured to selectively provide the $PDL_{comp}$. Accordingly, the compensating loss element 108 provides the $PDL_{comp}$ to compensate for at least a portion of the first entanglement loss.

The compensating loss element 108 may be as has already been described. In some embodiments of the methods disclosed herein, the compensating loss element 108 may be a tunable compensating loss element, and the step of selecting (132) a $PDL_{comp}$ may comprise the step of tuning (134) the compensating loss element 108 to maximize compensation for the first entanglement loss. In some embodiments, the step of selecting (132) a PDL$_{comp}$ may comprise the step of tuning (134a) the compensating loss element 108 to essentially completely compensate for the PDL portion of the first entanglement loss. The tuning (134) of the compensating loss element 108 is performed by adjusting the magnitude of the PDL applied by the PDL emulator 114 and the position of the polarization controller 110. The magnitude of the PDL applied by the PDL emulator 114 is manually adjusted and measured by connecting the emulator to a PDL-measurement device. The polarization controller 110 may include several paddles each of which includes loops of optical fiber. These paddles may be turned in order to adjust the orientation with which the PDL of the emulator is applied. In one non-limiting embodiment, the polarization controller 110 may be comprised of paddles which emulate a ¼ waveplate, a ½ waveplate, and another ¼ waveplate which can each be separately adjusted to provide a desired polarization state (such as, for instance, with separate knobs or paddles). Other waveplate combinations and/or other means for controlling polarization are also possible. The knobs or paddles may thus be turned to different positions until the maximum compensation of the first entanglement loss is achieved. In some cases, the knob or paddles may be manually adjusted by the user, and in other cases, these elements can be automatically adjusted using a feedback loop.

In some embodiments herein, the step of selecting a PDL$_{comp}$ may occur before the step of providing a compensating loss element. For example, when the optimum compensating loss is known from past experience, prior test or experimentation, or from analytical models, the step of selecting a PDL$_{comp}$ may occur before the step of providing a compensating loss element. These examples are not intended to be limiting.

In a communication system, the output of the first transmission channel 104 operatively interfaces with a first node of the communication system, and the output of the second transmission channel 106 operatively interfaces with a second node of the communication system. In the illustrated example, the first detector station 118 is provided at the first node, and the second detector station 120 is provided at the second node. Each node may include additional devices as necessary.

Figure 4:
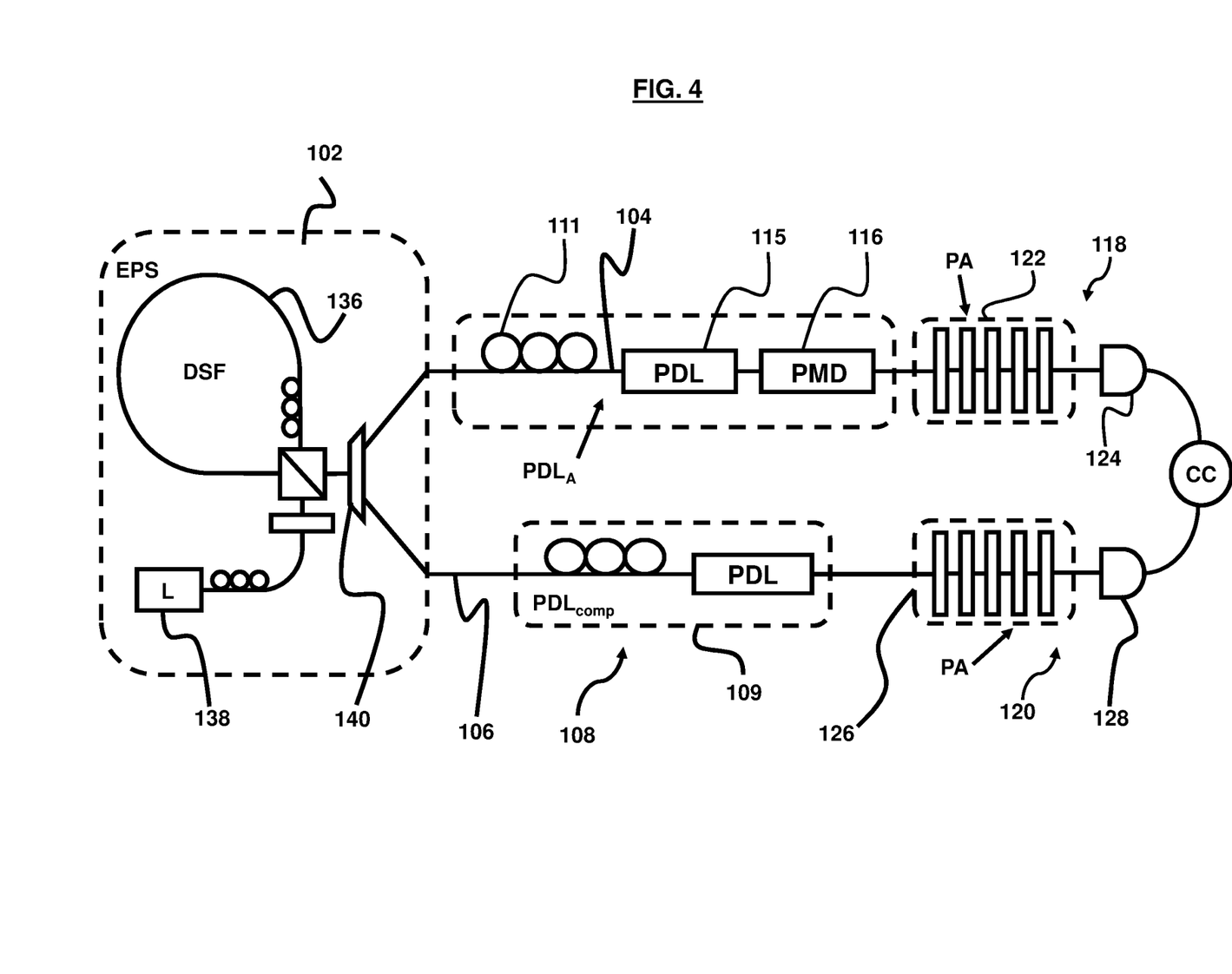
FIG. 4 is a schematic diagram illustrating an embodiment of the apparatus used for compensating for entanglement loss in a communication line according to some of the embodiments herein.

In some embodiments, the first entanglement loss 103 includes at least a PDL portion 105, and PMD portion 107 is also present in the first transmission channel 104. These losses are usually due to the inherent properties of the transmission line, but in an experimental testbed apparatus as shown in FIG. 4, the first entanglement loss may be simulated using one or more polarization controllers 111, a variable PDL emulator 115, and a variable PMD emulator 116, as in the illustrated embodiment. Even in the presence of PMD, the PDL portion of the first entanglement loss is at least partially compensated for by the PDL$_{comp}$ by selecting an appropriate magnitude and an appropriate orientation for the PDL$_{comp}$ using the compensating loss element 108. Preferably, the magnitude and orientation of the PDL$_{comp}$ are optimized through proper selection to maximize compensation for the PDL portion of the first entanglement loss in the first transmission channel 104.

In some embodiments, the compensating PDL, also referred to as PDL$_{comp}$, has a magnitude and orientation that are optimized through proper selection to essentially completely compensate for the PDL portion of the first entanglement loss in the first transmission channel 104.

Quantum networks exploit the properties of quantum mechanics to offer functionalities that are unavailable to their classical counterparts. Many of these applications require nodes which have the ability to create and store states of two or more entangled particles and channels which can transmit these states with high fidelity between nodes. Unlike classical information which can be copied and sent multiple times in order to overcome channel decoherence, quantum information cannot be copied; therefore, extreme care must be taken to ensure the faithful transmission of a quantum state through a transmission channel. Ideally, future quantum networks will leverage the existing fiber optic infrastructure in order to facilitate wide-spread adoption with minimal overhead. For this to become a reality, strategies for overcoming the physical properties of optical fibers and components must be developed. For qubit encodings based on polarization the primary properties are PDL and PMD.

The deleterious effects of aggregate PDLs on the entanglement of a two-qubit polarization-entangled state can be compensated for using local filtration, even when PMD is present in one of the two channels. The model emphasizes a geometrical view of PDL in Stokes space, which suggests an intuitive physical interpretation of why non-local PDL compensation works when no PMD is present. The extension of this model to the case with PMD in one of the two channels reveals that complete PDL compensation now only occurs for one direction in Stokes space. The complete PDL compensation in the presence of PMD is experimentally verified as described below. The agreement between the solution provided by the embodiments herein and the experimental results is excellent.

Figure 6:
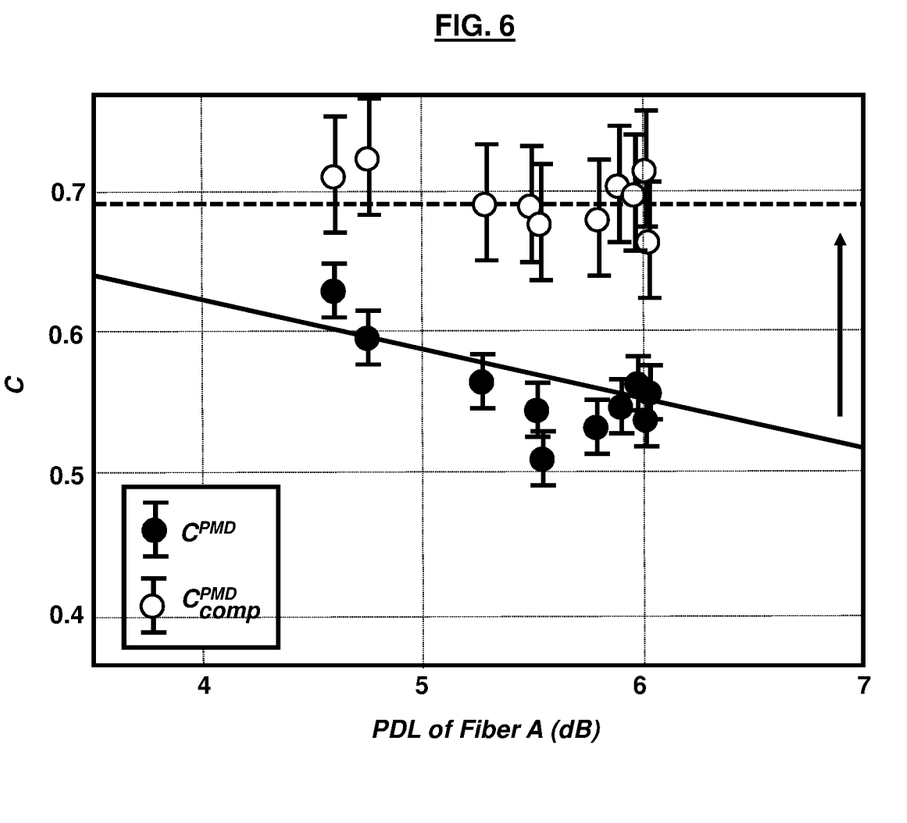
FIG. 6 is a graph illustrating the results of compensation of concurrence lost due to PDL in the presence of polarization mode dispersion (PMD) using a compensation method in accordance with an embodiment herein; the data on the lower correlation line are the uncompensated concurrence values and the data on the upper correlation line are the compensated concurrence values, all as a function of PDL in the first channel.
Figure 7A:
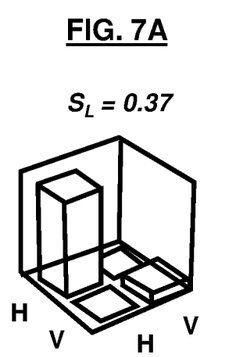
FIGS. 7A through 7D are graphs illustrating experimentally measured partial density matrices for the qubit in channel A for different alignments of the compensating PDL in channel B according to some of the embodiments herein.
Figure 7B:
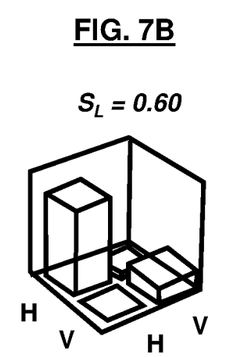
Figure 7C:
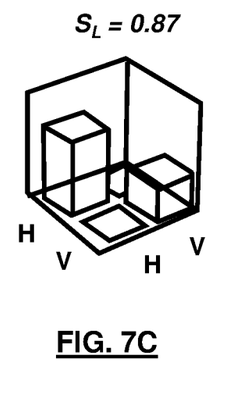
Figure 7D:
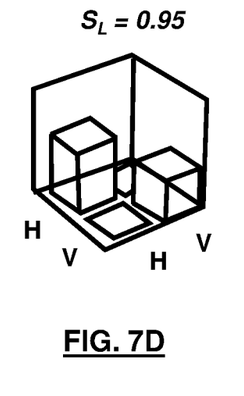

FIG. 6 illustrates the experimental setup, used for testing some of the methods herein, which includes an entangled photon source that emits polarization entangled photons into two fiber channels. PMD and PDL of arbitrary magnitude and orientation was applied to the channels using polarization controllers and variable PMD/PDL emulators. For all results discussed in this abstract, PMD was set to τ=6.6 ps. The two detector stations are comprised of polarization analyzers 122, 126 and InGaAs single photon detectors 124, 128 with efficiencies of approximately η=20%. Entangled pairs are created by pumping a dispersion shifted fiber 136 with a 50 MHz pulsed fiber laser 138 at 1552.52 nm. The signal and idler which result are split by a WDM demux 140 with ITU channel 28 (1554.94 nm) into one fiber 104 and ITU channel 34 (1550.12 nm) into the other fiber 106. The average number of entangled photon pairs per input pulse is in the range of μ=0.001-0.1 depending on the pump power. The measurements required for full state tomography are performed by FPGA-based controller software. An initial decrease in the entanglement of pairs produced by our source from their maximum theoretical value is due to Raman noise photons, which take an initial state of C=1 to approximately C~0.93. The PMD in channel A is then responsible for the decrease from C~0.93 to the measured value of C=0.69.

Figure 5:
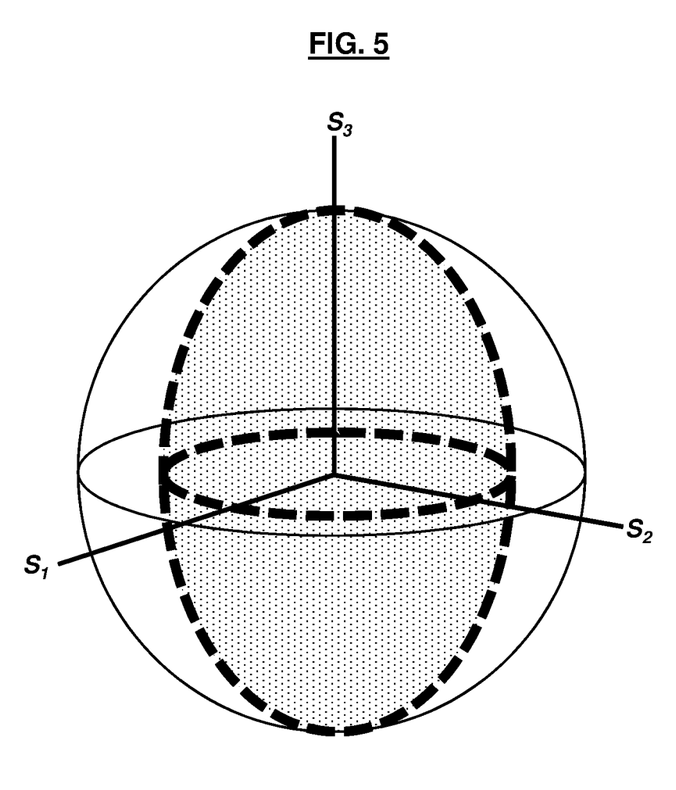
FIG. 5 is a graph illustrating the value of $T\hat{\gamma}$ surface with heavy dashed outline) as a function of the orientation of $\hat{\gamma}$ in Stokes space in an embodiment herein.

PDL is treated using the rotational form:

$$P = e^{-\alpha/2} \exp\left(\frac{\vec{\alpha}\cdot\vec{\sigma}}{2}\right),$$

which allows one to relate the orientation of the PDL to a vector in Stokes space using $\vec{\alpha} = \alpha\hat{\alpha}$, where α is the magnitude of the PDL and $\hat{\alpha}$ is a unit Stokes vector which points in the direction of maximum transmission. The Stokes vector includes three coordinates denoted as S1, S2, and S3. For a given power of light, these parameters fully determine the polarization state of that light. These three parameters can be mapped directly onto the surface of a sphere, as in FIG. 5. Each polarization state is a point on the surface of the sphere, and antipodal points represent pairs of orthogonal polarizations. If the initial state is a Bell state, then the same final density matrix (assuming post selection) results whether PDL is applied in the $\hat{\gamma}_A$ direction in channel A or the $\hat{\gamma}_B = T\hat{\gamma}_A$ orientation in channel B, where T is the correlation matrix of the Bell state when expanded in the Fano form. For Bell diagonal states, the T matrix is diagonal, and for states that are maximally entangled all of the entries have a magnitude of one. Using this result, it can be seen that whenever PDL is present in both channels, the system can instead be modeled as having two PDLs in one channel only. Therefore, it can be seen that PDL compensation occurs whenever the actual PDL of a channel and the effective PDL translated from the other channel are of equal magnitude and orthogonal orientation. The presence of PMD on one of the two qubits complicates the situation because it takes a Bell state to a rank-2 Bell diagonal state, where it is not always possible to model a final density matrix as having resulted from PDL on either qubit. Complete PDL compensation only occurs for orientations of PDL where $|T\hat{\gamma}|=1$, which for rank-2 Bell diagonal states only occurs in one direction in Stokes space. When PMD is present, the diagonal entries of the T matrix mentioned above can have magnitude less than one; and hence, there are orientations where $|T\hat{\gamma}|<1$. As an example, the value of $T\hat{\gamma}$ for a rank-2 Bell diagonal state has been plotted as a function of $\hat{\gamma}$ orientations in Stokes space in FIG. 5. Perfect nonlocal compensation can only occur when $|T\hat{\gamma}|=1$. These regions can be seen visually in FIG. 5 and correspond to the ovoid surface illustrated using heavy dashed line. For PDL oriented in any direction other than the poles, PDL compensation will be partial, and $|T\hat{\gamma}|<1$. The experimental results of non-local PDL compensation with PMD in one channel are presented in FIG. 8 as a function of the magnitude of the PDL being compensated. The uncompensated concurrence values are those along the lower correlation line with the negative slope, which represent the concurrence of the state with PDL only in channel A. The compensated concurrence values are then shown along the upper, essentially horizontal correlation line, where an additional PDL element has been inserted into channel B to non-locally compensate for $PDL_A$. As can be seen in FIG. 8, as the PDL in channel A increases, the uncompensated concurrence steadily decreases from the initial value of C=0.69, but that the initial concurrence is always recovered by compensation.

FIGS. 7A through 7D show the local density matrices of the qubit in channel A, for a fixed $PDL_A$ but for different orientations of $PDL_{comp}$, along with their corresponding linear entropies. Density matrices are a common and complete way of representing all information that can be known, even in principle, about a given quantum system. By local density matrix we mean that only the quantum state of a single qubit is represented in FIGS. 7A through 7D. A local density matrix for only one qubit of a two-qubit system is obtained by performing a partial trace, a common linear algebra technique, to the density matrix of the larger quantum system. For a single qubit, the local density matrix is a 2×2 matrix including four entries, which are represented graphically as bar graphs in FIGS. 7A through 7D. The labels "H" and "V" are used to index the entries of the local density matrices and represent orthogonal polarization states. Optimal compensation occurs when the local density matrices become completely mixed, where mixedness is measured for a density matrix p by the linear entropy $S_L = 2(1 - Tr(\rho^2))$ where Tr is the trace. Note that we use a normalized version of linear entropy which ranges from 0 for a pure state and 1 for a totally mixed state. The series of bar graphs shown in FIGS. 7A through 7D illustrate the process of manually finding the optimal alignment where the $S_L$ values approach 1.

In the foregoing description and attached figures, "first transmission channel," "channel A," and "Fiber A" are used interchangeably. Also, "second transmission channel" and "channel B" are used interchangeably herein. However, it will be appreciated that any type of quantum channel can be used including, without limitation, fiber, vacuum, or air. Furthermore, $PDL_A$ is used interchangeably with the "PDL portion of the first entanglement loss" herein.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A method for compensating for entanglement loss in communication channels in a communication system comprising at least one entangled photon source and at least a first transmission channel and a second transmission channel, the first transmission channel exhibiting a first entanglement loss, the method comprising:
   providing a compensating loss element in the second transmission channel; and
   selecting a compensating polarization dependent loss (PDLcomp) for being provided in the second transmission channel,
   wherein the PDLcomp is selected to compensate for at least a portion of the first entanglement loss.

2. The method of claim 1, wherein the entangled photon source outputs photons in the form of pairs of entangled photons, wherein the first transmission channel has an input and an output, wherein the second transmission channel has an input and an output, wherein at least some photons from the entangled photon source are directed to the input of the first transmission channel for transmission via the first transmission channel and at least some other of the photons from the entangled photon source are directed into the input of the second transmission channel for transmission via the second transmission channel, wherein the photons directed to the input of the first transmission channel or transmitted through the first transmission channel are first channel photons, wherein the photons directed to the input of the second transmission channel or transmitted through the second transmission channel are second channel photons, wherein at least some of the first channel photons are entangled photons, wherein at least some of the second channel photons are entangled photons that are entangled with a number of the entangled photons in the first channel in accordance with a level of entanglement, wherein the level of entanglement between the entangled photons in each channel at the output of each channel is restored at least in part such that the level of entanglement between the entangled photons in each channel at the output of each channel is at least closer to the level of entanglement between the entangled photons in each channel at the input of each channel as a result of the action of the compensating loss element.

3. The method of claim 2, wherein the level of entanglement is measured by a concurrence value, and wherein the concurrence value between the entangled photons in each channel at the output of each channel is restored essentially to the same concurrence value between the entangled photons in each channel at the input of each channel as a result of the action of the compensating loss element.

4. The method of claim 2, wherein the output of the first transmission channel operatively interfaces with a first node of the communication system, and wherein the output of the second transmission channel operatively interfaces with a second node of the communication system.

5. The method of claim 1, wherein the compensating loss element comprises at least one polarization controller.

6. The method of claim 1, wherein the compensating loss element is a tunable compensating loss element.

7. The method of claim 6, wherein the step of selecting a PDLcomp comprises tuning the compensating loss element to maximize compensation for the first entanglement loss.

8. The method of claim 6, wherein the first entanglement loss comprises at least a PDL portion, and wherein the step of selecting a PDLcomp comprises tuning the compensating loss element to essentially completely compensate for the PDL portion of the first entanglement loss.

9. The method of claim 1, wherein the first entanglement loss includes at least a PDL portion and a polarization mode dispersion (PMD) portion, wherein the PDL portion is at least partially compensated for by the PDLcomp.

10. The method of claim 9, wherein the compensating loss element comprises at least one polarization controller and at least one variable PDL emulator.

11. The method of claim 10, wherein the PDLcomp has a magnitude and an orientation that are optimized through proper selection to maximize compensation for the PDL portion of the first entanglement loss in the first transmission channel.

12. The method of claim 1, wherein the compensating loss element comprises at least one polarization controller and at least one variable polarization dependent loss (PDL) emulator.

13. The method of claim 1, wherein the first entanglement loss comprises at least a polarization dependent loss (PDL) portion, and wherein the compensating polarization dependent loss (PDLcomp) has a magnitude and orientation that are optimized through proper selection to essentially completely compensate for the PDL portion of the first entanglement loss in the first transmission channel.

14. A communication system comprising:
at least one entangled photon source;
at least a first transmission channel and a second transmission channel, the first transmission channel exhibiting a first entanglement loss; and
a compensating loss element provided in the second transmission channel, which provides a compensating polarization dependent loss (PDLcomp) to compensate for at least a portion of the first entanglement loss.

15. The communication system of claim 14, wherein the entangled photon source outputs photons in the form of pairs of entangled photons, wherein the first transmission channel has an input and an output, wherein the second transmission channel has an input and an output, wherein at least some photons from the entangled photon source are directed to the input of the first transmission channel for transmission via the first transmission channel and at least some other of the photons from the entangled photon source are directed into the input of the second transmission channel for transmission via the second transmission channel, wherein the photons directed to the input of the first transmission channel or transmitted through the first transmission channel are first channel photons, wherein the photons directed to the input of the second transmission channel or transmitted through the second transmission channel are second channel photons, wherein at least some of the first channel photons are entangled photons, wherein at least some of the second channel photons are entangled photons that are entangled with a number of the entangled photons in the first channel in accordance with a level of entanglement, wherein the level of entanglement between the entangled photons in each channel at the output of each channel is restored at least in part such that the level of entanglement between the entangled photons in each channel at the output of each channel is at least closer to the level of entanglement between the entangled photons in each channel at the input of each channel as a result of the action of the compensating loss element.

16. The communication system of claim 15, wherein the level of entanglement is measured by a concurrence value, and wherein the concurrence value between the entangled photons in each channel at the output of each channel is restored essentially to the same concurrence value between the entangled photons in each channel at the input of each channel as a result of the action of the compensating loss element.

17. The communication system of claim 15, further comprising:
a first detector station provided at the output of the first transmission channel, the first detector station comprising at least one polarization analyzer for the first transmission channel and a single photon detector for the first transmission channel; and
a second detector station provided at the output of the second transmission channel, the second detector station comprising at least one polarization analyzer for the second transmission channel and a single photon detector for the second transmission channel.

18. The communication system of claim 14, wherein the compensating loss element comprises at least one polarization controller.

19. The communication system of claim 14, wherein the compensating loss element is a tunable compensating loss element, and wherein the PDLcomp is selected by tuning the compensating loss element to maximize compensation for the first entanglement loss.

20. The communication system of claim 14, wherein the compensating loss element comprises at least one polarization controller and at least one variable polarization dependent loss (PDL) emulator.

* * * * *